United States Patent
Hänninen et al.

(10) Patent No.: US 7,436,807 B2
(45) Date of Patent: Oct. 14, 2008

(54) COMMUNICATION NETWORK

(75) Inventors: Timo Hänninen, Tampere (FI); Markku Rautiola, Tampere (FI); Tapio Siik, Lampäälä (FI); Petri Uosukainen, Tampere (FI); Hannu Honkala, Tampere (FI); Jari Pekka Rissanen, Tampere (FI); Kai Närvänen, Pirkkala (FI); Roy Mickos, Tampere (FI)

(73) Assignee: Nokia Corporation, Espoo (FI)

( * ) Notice: Subject to any disclaimer, the term of this patent is extended or adjusted under 35 U.S.C. 154(b) by 1339 days.

(21) Appl. No.: 09/732,293

(22) Filed: Dec. 8, 2000

(65) Prior Publication Data
US 2001/0007554 A1 Jul. 12, 2001

(30) Foreign Application Priority Data
Dec. 10, 1999 (GB) .................................. 9929335.9

(51) Int. Cl.
*H04B 7/212* (2006.01)
*H04J 3/16* (2006.01)
*H04Q 7/20* (2006.01)
*H04L 12/66* (2006.01)

(52) U.S. Cl. ................ 370/337; 370/338; 370/347; 370/401; 370/465; 370/468; 455/436; 455/452.2; 455/453

(58) Field of Classification Search ............ 370/235, 370/238, 328, 329, 331, 336, 337, 338, 345, 370/347, 352, 401, 437, 442, 458, 465, 468; 455/422.1, 432.1, 436, 439, 445, 450, 452.1, 455/452.2, 453, 509, 511
See application file for complete search history.

(56) References Cited

U.S. PATENT DOCUMENTS

| | | | | | |
|---|---|---|---|---|---|
| 5,327,576 | A | * | 7/1994 | Uddenfeldt et al. | 370/333 |
| 5,504,939 | A | * | 4/1996 | Mayrand et al. | 455/450 |
| 5,757,792 | A | * | 5/1998 | Aoki | 370/347 |
| 5,940,763 | A | * | 8/1999 | Alperovich et al. | 455/450 |
| 5,949,769 | A | * | 9/1999 | Davidson et al. | 370/329 |
| 6,014,568 | A | * | 1/2000 | Alperovich et al. | 455/456.3 |
| 6,028,854 | A | * | 2/2000 | Raith et al. | 370/347 |

(Continued)

FOREIGN PATENT DOCUMENTS

EP 0827308 A2 4/1998

(Continued)

OTHER PUBLICATIONS

Jori Paananen: "Internet Telephony Merges 5 with the GSM Network", ECRIM News Online Edtion No. 37, Apr. 1999, pp. 1-2, XP002124263.

*Primary Examiner*—Alpus H Hsu
(74) *Attorney, Agent, or Firm*—Squire, Sanders & Dempsey, L.L.P.

(57) ABSTRACT

A network for communicating with a plurality of radiotelephones via respective communication channels over timeslots on a carrier, wherein the channels can operate at a first or second data rate such that a timeslot on the carrier can transmit a single communication channel operating at the first data rate or two communication channels operating at the second data rate, the network comprising a controller responsive to a predetermined condition for initiating a change in the data rate of two channels transmitted on separate timeslots from the first data rate to the second data rate.

22 Claims, 1 Drawing Sheet

U.S. PATENT DOCUMENTS

| | | | | |
|---|---|---|---|---|
| 6,112,088 A | * | 8/2000 | Haartsen | 455/437 |
| 6,138,020 A | * | 10/2000 | Galyas et al. | 455/436 |
| 6,167,040 A | * | 12/2000 | Haeggstrom | 370/352 |
| 6,181,686 B1 | * | 1/2001 | Hamalainen et al. | 370/347 |
| 6,292,664 B1 | * | 9/2001 | Ostrup et al. | 455/453 |
| 6,295,453 B1 | * | 9/2001 | Desgagne et al. | 455/448 |
| 6,400,954 B1 | * | 6/2002 | Khan et al. | 455/450 |
| 6,519,461 B1 | * | 2/2003 | Andersson et al. | 455/453 |
| 6,535,497 B1 | * | 3/2003 | Raith | 370/336 |
| 6,577,637 B1 | * | 6/2003 | Sieppi | 370/401 |
| 6,678,527 B1 | * | 1/2004 | Rasanen | 455/450 |

FOREIGN PATENT DOCUMENTS

| | | |
|---|---|---|
| EP | 0892508 A2 | 1/1999 |
| WO | 9729566 | 8/1997 |
| WO | 9846580 | 10/1998 |
| WO | 9953700 | 10/1999 |

* cited by examiner

COMMUNICATION NETWORK

BACKGROUND OF THE INVENTION

1. Field of the Invention

This invention relates to a communication network, in particular a communication network for dynamically allocating channels.

2. Description of the Prior Art

The popularity of cellular communication is, in part, due to its ability to allow a relatively large number of users to establish communication links over a relatively limited bandwidth. However, as the popularity of cellular communication continues to increase, the demands for increased capacity continue.

Time Division Multiple Access (TDMA) cellular communication systems increase capacity by splitting a carrier frequency into a plurality of timeslots, thereby allowing a plurality of communication channels to be established over the same carrier frequency.

To allow speech data to be transmitted in a timeslot, the speech data is compressed using a codec.

To further increase capacity certain TDMA standards, for example GSM, allow the use of a half rate codec. The half rate codec cuts the amount of data needed to adequately represent human speech sounds by half when compared with a full rate codec, thereby allowing two channels to share the same time slot on a carrier with minimal degradation in speech quality.

The GSM standard allows two radiotelephones operating at half speech rate to use the same resource as a single full speech rate radiotelephone by alternatively transmitting the respective radiotelephone signals in the assigned timeslot. Therefore, when system capacity is being stretched, a new channel can be established at half speech rate, with only a minimum deterioration in speech quality. When system capacity requirements are low, new channels can be established at full speech rate.

However, the use of a half speech rate channel has to be determined at channel set-up. As system capacity varies with time this may result in the capacity of the network not being optimally configured at all times.

It would be desirable to improve this situation.

SUMMARY OF THE INVENTION

In accordance with a first aspect of the present invention, there is provided a network for communicating with a plurality of radiotelephones via respective communication channels over timeslots on a carrier, wherein the channels can operate at a first or second data rate such that a timeslot on the carrier can transmit a single communication channel operating at the first data rate or two communication channels operating at the second data rate, the network comprising a controller responsive to a predetermined condition for initiating a change in the data rate of a transmitted channel from the first data rate to the second data rate.

Preferably, the controller is responsive to the predetermined condition to initiate a change in the data rate of two channels transmitted on separate timeslots from the first data rate to the second data rate and combining of the two channels onto the same timeslot.

This provides the advantage of allowing channel allocation between full speech rate and half speech rate to be performed dynamically in accordance with system capacity requirements. This minimizes the risk of channel blocking due to system capacity limitations. Preferably the predetermined condition is that the number of channels established in the network exceeds a predetermined threshold.

This allows established channels to be combined onto a single timeslot dynamically when the limits of system capacity are being reached.

Most preferably, the predetermined condition is the initiation of a channel with a second network.

Where the first network is an internal network and the second network is an external network, this provides the advantage of the first network being able to provide a better service to the external network.

Suitably the two channels originate in the network.

In accordance with a second aspect of the present invention, there is provided a controller for operation in a network wherein the network communicates with a plurality of radiotelephones via respective communication channels over timeslots on a carrier, the channels being operable at a first or second data rate such that a timeslot on the carrier can transmit a single communication channel operating at the first data rate or two communication channels operating at the second data rate, the controller comprising means responsive to a predetermined condition for initiating a change in the data rate of a transmitted channel from the first data rate to the second data rate.

In accordance with a third aspect of the present invention, there is provided a radiotelephone for operation with a network which initiates a change in data rate of a transmitted channel from a first data rate to a second data rate, the radiotelephone comprising a controller responsive to a signal from the network for changing the data rate of data being transmitted on a channel from the radiotelephone.

In accordance with a fourth aspect of the present invention, there is provided a method of communicating with a plurality of radiotelephones via respective communication channels over timeslots on a carrier, wherein the channels can operate at a first or a second data rate such that a timeslot on the carrier can transmit a single communication channel operating at the first data rate or two communication channels operating at the second data rate, the method comprising changing the data rate of a transmitted channel from the first data rate to the second data rate in response to a predetermined condition.

BRIEF DESCRIPTION OF THE DRAWINGS

For a better understanding of the present invention and to understand how the same may be brought into effect reference will now be made, by way of example only, to the accompanying drawings, in which.

DETAILED DESCRIPTION OF THE INVENTION

Figure 1:
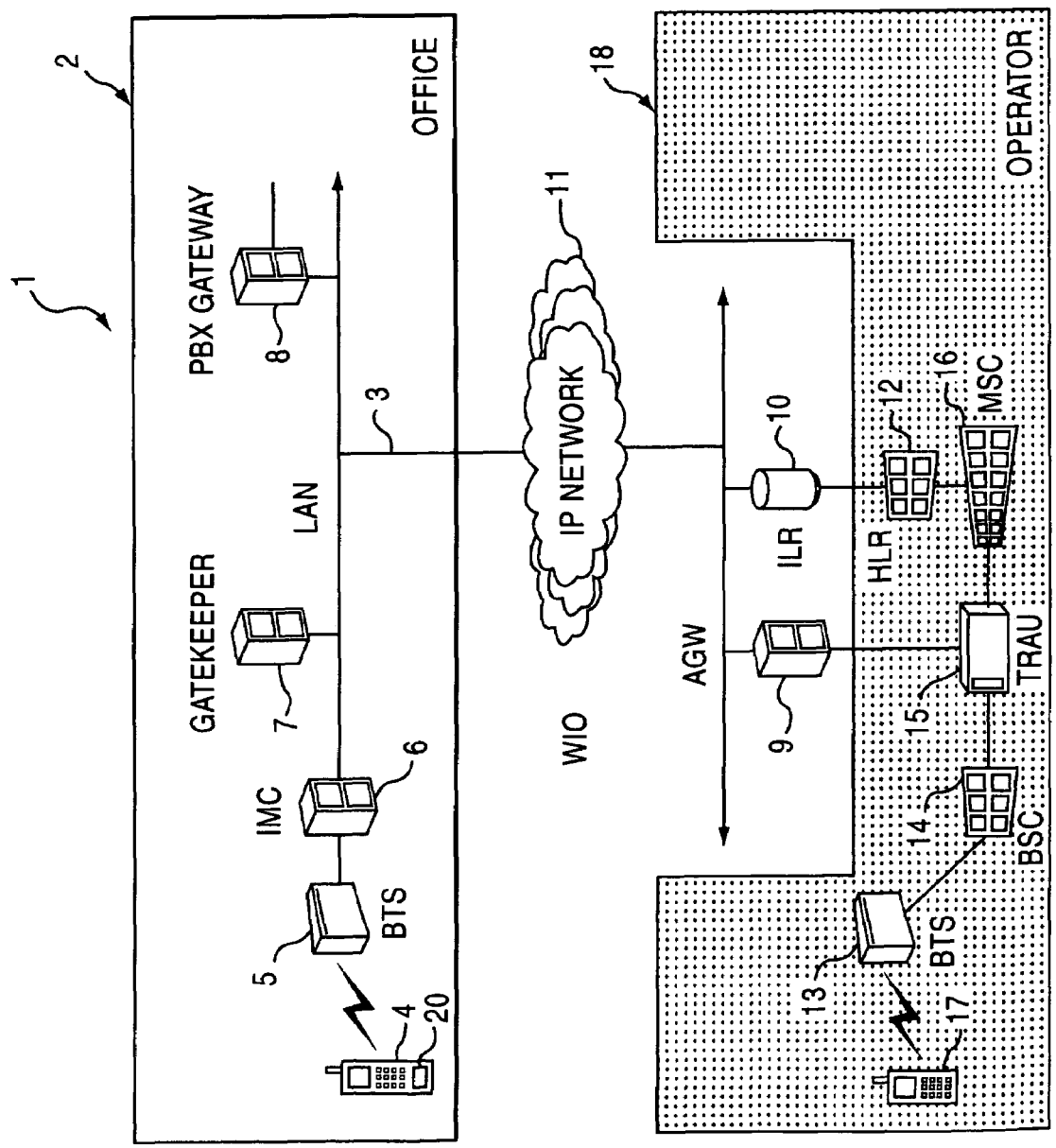
FIG. 1 illustrates a communication network according to an embodiment of the present invention.

FIG. 1 shows a communication system 1 comprising a wireless intranet office (WIO) network 2 coupled to a GSM operator network 18.

The WIO network 2 is based around an office's local area network 3 (LAN), which is used as a platform for carrying, via IP traffic, wireless data communication received from a radiotelephone 4, thereby allowing IP telephony. Typically the IP telephony over the LAN 3 will be in accordance with the ITU H.323 standard.

The mobile GSM operator network 18 is based on a conventional cellular GSM network. The WIO network 2 comprises a base transceiver station 5 (BTS), a local area network 3 (LAN), an intranet mobile cluster 6 (IMC), a gatekeeper 7, a public branch exchange (PBX) gateway 8, an A-interface gateway 9 (AGW) and an intranet location register 10 (ILR).

The BTS 5 is for communicating with a plurality of radiotelephones 4 (of which only one is shown) over respective communication channels in the WIO environment. The air interface between the radiotelephones 4 and the BTS 5 corresponds to a TDMA mobile communication standard, for example GSM. Accordingly, the respective communication channels are established over time slots transmitted on a carrier. In accordance with the GSM standard each carrier frequency is subdivided into eight timeslots, where the set of eight time slots is referred to as a TOMA frame. The BTS 5 can have between one and sixteen transceivers, each of which represents a separate RF channel. In this embodiment, however, a single transceiver (not shown) is used.

The BTS 5 is connected to the LAN 3, for example an ethernet network, via the IMC 6. The BTS 5 is connected to the IMC 6 via a pulse code modulation (PCM) link. The PCM link is a 2.048 Mb fixed line standard. Typically a plurality of BTS 5 are connected to the 1 MC 6, however, for the purposes of this embodiment a single BTS 5 is connected.

The IMC 6 handles the radio resources and channel configurations of the BTS 5 and converts IP traffic received from the LAN 3 to pulse code modulated GSM traffic for transmission by the BTS 5 and vice versa.

Coupled to the LAN 3 is the gatekeeper 7. The gatekeeper 7 provides the WIO network call control functions, for example call forwarding and automatic rerouting. The gatekeeper 7, acting as a network controller, is responsible, when a call is being established, for instructing the IMC 6 to allocate the respective communication channel between the BTS 5 and radiotelephone 4 to an available timeslot on the carrier frequency of the BTS's 5 transceiver.

The gatekeeper 7 monitors calls established over the WIO network 2 and can initiate, in response to a predetermined condition, a change in data rate of a call within the WIO. Additionally, the gatekeeper 7 can combine two half speech rate channels on the same carrier in different timeslots onto the same timeslot.

The change in data rate is initiated by sending a control signal from the gatekeeper 7 to at least one controller 20 of the respective radiotelephones 4 instructing the radiotelephones 4 to operate in either full speech rate or half speech rate. The moving of two half speech rate channels to a single timeslot is initiated by instructing the IMC 6 to control the hand-over.

Two examples of the predetermined conditions are, one, establishing a call with a second network and, two, the number of available timeslots falls below a predetermined threshold.

Optionally a PBX gateway 8 is connected to the LAN 3. The PBX gateway 8 interfaces the LAN 3, for purposes of IP telephony, to a PBX system (not shown).

Also connected to the LAN 3 is the AGW 9. The AGW 9 acts as an interface between the WIO 2 and the GSM operator network 18. The AGW 9 converts GSM pulse code modulation traffic received from the GSM operator network 18 into IP traffic and vice versa. The AGW 9 can be connected directly to the LAN 3, however typically the AGW 9 is located remote to the LAN 3 at the GSM network operators office, connected to the WIO 2 via an IP network 11.

Connected to the LAN 3 is the ILR 10. The ILR 10 provides a database of mobile subscriber information for users of the WIO 2. All subscribers having a right to make a call over the WIO 2 will have a permanent entry in the ILR 10 database. The ILR 10 is connected to the HLR 12 of the GSM operator network 18.

The GSM operator network 18 comprises a basestation transceiver station 13 (BTS), a basestation controller 14 (BSC), a transcoder rate adapter unit 15 (TRAU), a mobile switching center 16 (MSC) and a home location register 12 (HLR).

The BTS 13 is for communicating with a plurality of radiotelephones 17 (of which only one is shown) over respective communication channels in the GSM operator environment. The air interface between the radiotelephones 17 and the BTS 13 corresponds to the GSM standard. In accordance with the GSM standard, each carrier frequency is subdivided into eight different timeslots. The BTS 13 has between one and sixteen transceivers (not shown), each of which represents a separate RF channel.

The BTS 13 is connected to the BSC 14 via a PCM link, this link between the BTS 13 and BSC 14 typically being known as an Abis interface. The Abis interface uses 64 kbps signalling subchannels in order to carry signalling data and submultiplexed 16 kbps channels for the transfer of user data, typically speech. The BSC monitors and controls the BTS's 13. Typically a plurality of BTS 13 are connected to the BSC 14.

The BSC 14 is connected to the MSC 16 over a PCM 30 link via a transcoder rate adapter unit (TRAU) 15. Alternatively, however, the TRAU 15 can be connected between the BTS 13 and BSC 14. The TRAU 15 transforms the speech data, typically transmitted at 13 kbps, in and out of the 64 kbps channels, as is well known to a person skilled in the art.

The MSC 16 acts as an exchange for switching calls between radiotelephones registered on the mobile GSM operator network 18. The MSC 16 also acts as an interface between the GSM operator network 18 and the public switch telephone network (PSTN) (not shown) for routing calls between the GSM operator network 18 and the PSTN.

Connected to the MSC 16 is the HLR 12. The HLR 12 stores the identity and user data of all the subscribers registered with the GSM operator network 18. The HLR 12 is connected to the ILR 10 of the WIO 2.

The following example describes how a call is established between two WIO subscribers A and B (not shown) (i.e. owners of radiotelephones A and B that are registered for use in the WIO network) where both radiotelephones A and B are within the transmitter range of the BTS 5 transceiver. In this example subscriber A initiates the call.

Subscriber A dials and transmits to the BTS 5 the telephone number of subscriber B. The BTS 5 converts the call request from a RF signal into PCM format for transmission to the IMC 6, via the PCM 30 link.

The IMC 6 converts the PCM signal into IP traffic and passes the call request, via the LAN 3, to the gatekeeper 7.

The gatekeeper 7 determines, by checking with the ILR 10, whether subscriber B is registered with the WIO 2 and also if the subscriber B is currently inside the WIO 2.

If subscriber B is in the WIO network 2, the gatekeeper 7 instructs the BTS 5, via the IMC 6, to start to transmit a paging signal informing subscriber B that a call is waiting. If the WIO 2 includes a plurality of BTS 5, the gatekeeper 7 would instruct all BTS 5 to transmit a corresponding paging signal.

In response to subscriber B answering the paging requests the gatekeeper 7 informs the IMC 6 to establish a connection between subscriber A and subscriber B over respective timeslots. Therefore, one communication channel will be established in one timeslot between subscriber A and the BTS 5 and a second communication channel will be established in a second timeslot between subscriber B and the BTS 5.

The above embodiment of the WIO network 2 has only eight available timeslots (i.e. the network has a single BTS 5 with a single transceiver). Of the eight available timeslots one timeslot is used for the broadcast control channel (BCCI-I), a second timeslot is used for the communication channel between subscriber A and the BTS 5 and a third timeslot is used for the communication channel between subscriber B and the BTS 5. If two further calls are established between users within the WIO network 2 (i.e. four channels are established over four of the five available timeslots) this will only leave one timeslot available. To ensure sufficient resources are available for further connections, the gatekeeper 7 instructs two of the subscribers currently utilizing a timeslot at full speech rate to change to half speech rate and for the IMC 6 to combine the two half speech rate channels onto the same timeslot. This allows one of the timeslots to be released. Subsequently, if some of the connections are dropped, the gatekeeper 7 can instruct the subscribers transmitting at half speech rate to transmit at full speech rate and for the IMC 6 to ensure the respective subscribers are placed on separate timeslots As would be appreciated by a person skilled in the art, the WIO network 2 may comprise additional BTS 5, each BTS 5 having up to 16 transceivers.

The following example describes how a call is established between two WIO subscribers C and D (not shown) where subscriber C is within the WIO network 2 while subscriber D, who is also a subscriber to the mobile GSM operator network 18, is outside the WIO network 2 but within the mobile GSM operator network 18.

Subscriber C dials and transmits to the BTS 5 the telephone number of subscriber D. The BTS 5 converts the call request from a RF signal into PCM format for transmission to the IMC 6, via the PCM 30 link.

The IMC 6 converts the PCM signal into IP traffic and passes the call request, via the LAN 3, to the gatekeeper 7

The gatekeeper 7 determines, by checking with the ILR 10, as to whether subscriber D is registered with the WIO network 2 and also if the subscriber D is currently inside the WIO network 2. If subscriber D is not inside the WIO network 2, the gatekeeper 7 recognizes from the telephone number of radiotelephone D that subscriber D is also a subscriber of the GSM operator network 18 and routes a paging message for subscriber D to the AGW 9 for paging of subscriber D on the GSM operator network 18.

The AGW 9 passes the paging message to the MSC 16, via the TRAU 15. The MSC 16 determines, by checking the HLR 12, whether subscriber D is registered with the GSM operator network 18 and if subscriber D is currently inside the GSM operator network 18.

If subscriber D is in the GSM operator network 18, the MSC 16 instructs the BTS 13, via the BSC 14 and TRAU 15, to start transmitting a paging signal informing subscriber D that a call is waiting.

In response to subscriber D answering the paging request the MSC 16 informs the gatekeeper 7, via the AGW 9 and TRAU 15. The gatekeeper 7 instructs the IMC 6 to establish a channel over a timeslot between the BTS 5 and subscriber C to allow a call to be established with subscriber D with an associated channel being established on a timeslot between subscriber D and the BTS 13. The gatekeeper 7 establishes a logical channel over the LAN 3 between the 1 MC 6 and AGW 9 for the call between subscriber C and D.

In this example, of the eight available timeslots transmitted by the BTS 5, one timeslot is used for the BCCH and a second timeslot is used for the communication channel between the BTS 5 and subscriber C, which is used for establishing a connection with subscriber D in the GSM operator network 18. If two further calls are placed between the WIO network 2 and the GSM operator network 18 and two calls are established between subscribers within the WIO network 2 this would result in all eight timeslots being allocated. One timeslot for the BCCH, three timeslots for calls placed between the WIO network 2 and GSM network 18 and four timeslots for the two internal WIO network 2 calls. In response to all eight timeslots being allocated, the gatekeeper can dynamically allocate channels to increase resources, as described above. Alternatively the gatekeeper 7 can dynamically allocate channels on initiation of a call from the GSM operator network 18. In response to a call request received by the gatekeeper 7 from a user on the GSM operator network 18 wanting to establish a call with a subscriber of the WIO network 2, the gatekeeper 7 instructs two WIO subscribers, each utilize a timeslot at full speech rate, to change to half speech rate and for the IMC 6 to combine the two half speech rate channels onto the same timeslot. This results in one of the timeslots being released, thereby allowing a call to be placed between the WIO subscriber and GSM operator network user.

The compressing of the two users speech data in the WIO network 2 from full speech rate to half rate can provide better voice quality than the compression of two users in the GSM operator network 18. If the speech data between two users on the GSM network 18 passes through the TRAU 15, from the first user to the MSC 16 and again from the MSC 16 to the second user, this can result in a deterioration of speech quality when operating at half rate speech. The WIO network 2 does not require a TRAU, thereby allowing an improved speech quality compared to the GSM network 18 when operating at half rate speech through a TRAU.

The present invention may include any novel feature or combination of features disclosed herein either explicitly or implicitly or any generalization thereof irrespective of whether or not it relates to the present claimed invention or mitigates any or all of the problems addressed. In view of the foregoing description it will be evident to a person skilled in the art that various modifications may be made within the scope of the invention, for example TDMA mobile communication standards other than GSM may be used.

What is claimed is:

1. A network, comprising:
 a controller configured to communicate with a plurality of radiotelephones via respective communication channels over a carrier, wherein the channels are configured to operate at a first or second data rate such that the carrier is configured to transmit data through a single communication channel operating at the first data rate or two communication channels operating at the second data rate, and, in response to an initiation of a call with a second network, configured to initiate a change in a data rate of a transmitting channel from the first data rate to the second data rate of the same transmitting channel.

2. The network according to claim 1 wherein the communication channels are timeslots on the carrier.

3. The network according to claim 2, wherein the channels are configured to operate at a first or second data rate such that a timeslot on the carrier is configured to transmit a single communication channel operating at the first data rate or two communication channels operating at the second data rate.

4. The network according to claim 2 wherein the controller is responsive to the initiation of the call with the second network for initiating a change in the data rate of two channels transmitted on separate timeslots from the first data rate to the second data rate and combining the two channels onto the same timeslot.

5. The network according to claim 1, wherein the first data rate is a full speech rate and the second data rate is a half speech rate.

6. The network according to claim 1, wherein the controller is responsive to the number of channels established in the network exceeding a predetermined threshold for initiating a change in the data rate of the transmitted channel from the first data rate to the second data rate.

7. The network according to claim 1, wherein the controller is further configured to perform the change of data rate of a transmitted channel for a connection between subscribers within the network.

8. An apparatus configured to operate in a network, the apparatus comprising:
a responding unit configured to respond to an initiation of a call with a second network, wherein a network is configured to communicate with a plurality of radiotelephones via respective communication channels over a carrier, the channels are configured to operate at a first or second data rate such that the carrier is configured to transmit data through a single communication channel operating at the first data rate or two communication channels operating at the second data rate; and
an initiating unit configured to initiate a change in a data rate of a transmitting channel from the first data rate to the second data rate of the same transmitting channel.

9. The apparatus according to claim 8 wherein the communication channels are timeslots on the carrier.

10. The apparatus according to claim 9, wherein the channels are configured to operate at a first or second data rate such that a timeslot on the carrier is configured to transmit a single communication operating at the first data rate or two communication channels operating at the second data rate.

11. The apparatus according to claim 9 wherein the apparatus is responsive to the initiation of a channel with the second network for initiating a change in the data rate of two channels transmitted on separate timeslots from the first data rate to the second data rate and combining the two channels onto the same timeslot.

12. The apparatus according to claim 8, wherein the first data rate is a full speech rate and the second data rate is a half speech rate.

13. The apparatus according to claim 8, wherein the apparatus is responsive to the number of channels established in the network exceeding a predetermined threshold for initiating a change in the data rate of the transmitted channel from the first data rate to the second data rate.

14. The apparatus according to claim 9 wherein the initiating device is further configured to perform the change of data rate of a transmitted channel for a connection between subscribers within the network.

15. An apparatus, comprising:
a controller, in response to a control signal from a network, configured to change a data rate of data being transmitted through a channel, wherein the network is configured to initiate a change in the data rate of the channel from a first data rate to a second data rate of the same channel in response to an initiation of a call between the network and a second network.

16. The apparatus according to claim 15, wherein the apparatus is a radiotelephone.

17. A method, comprising:
operating communication channels over a carrier in a network at a first or second data rate such that the carrier transmits data through a single communication channel operating at the first data rate or two communication channels operating at the second data rate; and
changing a data rate of a transmitting channel from the first data rate the second data rate of the same transmitting channel in response to an initiation of a call with a second network.

18. The method according to claim 17 wherein the communication channels are timeslots on the carrier.

19. The method according to claim 18, wherein the channels operate at a first or second data rate such that a timeslot on the carrier transmits a single communication channel operating at the first data rate or two communication channels operating a the second data rate.

20. The method according to claim 17, further comprising:
in response to the predetermined condition, initiating a change in the data rate of two channels transmitted on separate timeslots from the first data rate to the second data rate; and
combining the two channels onto the same timeslot.

21. An apparatus configured to operate in a network, the apparatus comprising:
responding means for responding to an initiation of a call with a second network, wherein a network communicates with a plurality of radiotelephones via respective communication channels over a carrier, the channels are configured to operate at a first or second data rate such that the carrier transmits data through a single communication channel operating at the first data rate or two communication channels operating at the second data rate; and
initiating means for initiating a change in a data rate of a transmitting channel from the first data rate to the second data rate of the same transmitting channel.

22. A network, comprising:
communicating means for communicating with a plurality of radiotelephones via respective communication channels over a carrier, wherein the channels are configured to operate at a first or second data rate such that the carrier is configured to transmit data through a single communication channel operating at the first data rate or two communication channels operating at the second data rate; and
initiating means for initiating, in response to an initiation of a call with a second network, a change in a data rate of a transmitting channel from the first data rate the second data rate of the same transmitting channel.

* * * * *